July 7, 1953

L. E. SEVISON 2,644,869

VOLTAGE REGULATOR AND CURRENT CONTROL
DEVICE FOR AUTOMOTIVE VEHICLES

Filed Jan. 4, 1952

INVENTOR.
LUTHER EARL SEVISON
BY
*Barnes, Kisselle, Laughlin & Raisch*

ATTORNEYS.

July 7, 1953   L. E. SEVISON   2,644,869
VOLTAGE REGULATOR AND CURRENT CONTROL
DEVICE FOR AUTOMOTIVE VEHICLES
Filed Jan. 4, 1952   3 Sheets-Sheet 2

INVENTOR.
LUTHER EARL SEVISON
BY
ATTORNEYS.

July 7, 1953
L. E. SEVISON
2,644,869
VOLTAGE REGULATOR AND CURRENT CONTROL
DEVICE FOR AUTOMOTIVE VEHICLES
Filed Jan. 4, 1952
3 Sheets-Sheet 3
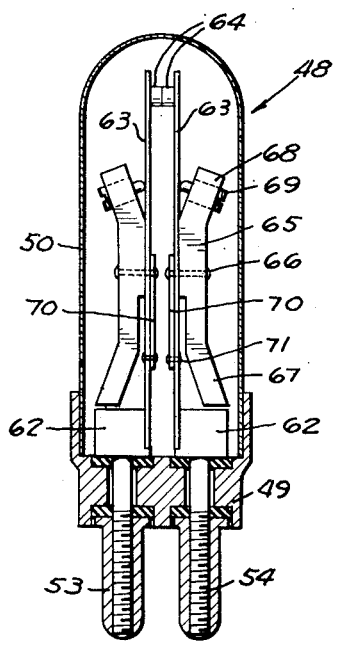
FIG. 6.
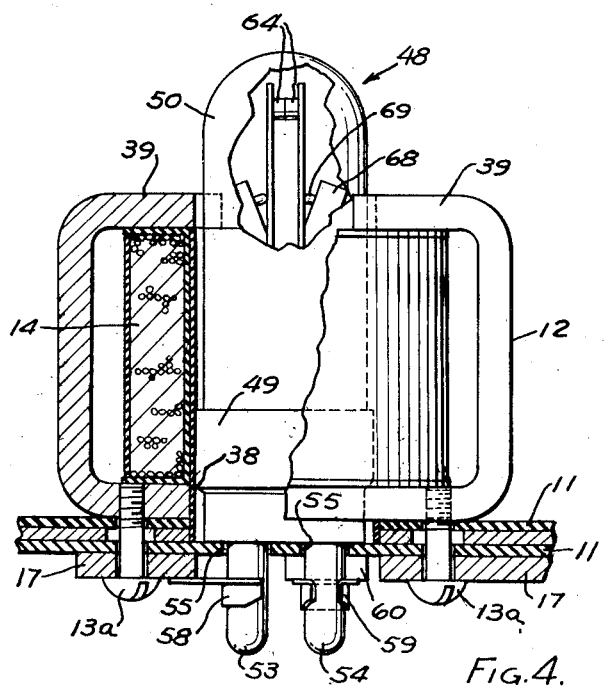
FIG. 4.
FIG. 5.
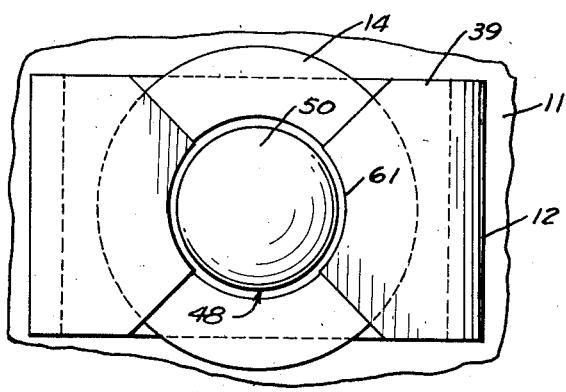
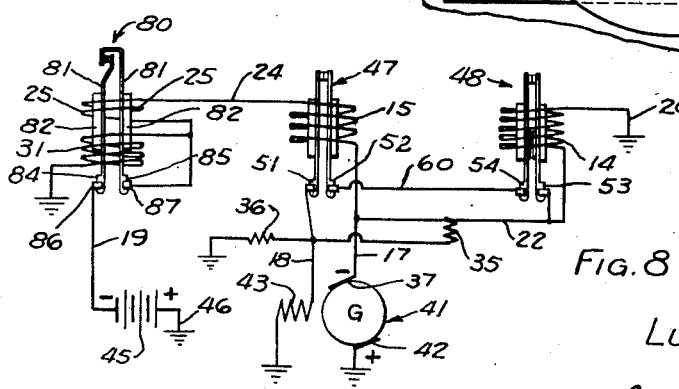
FIG. 8
INVENTOR.
LUTHER EARL SEVISON
BY
Barnes, Kisselle, Laughlin & Raisch
ATTORNEYS.

Patented July 7, 1953

2,644,869

UNITED STATES PATENT OFFICE 2,644,869

VOLTAGE REGULATOR AND CURRENT CONTROL DEVICE FOR AUTOMOTIVE VEHICLES

Luther Earl Sevison, Toledo, Ohio

Application January 4, 1952, Serial No. 265,000

2 Claims. (Cl. 200—103)

This invention relates to a device for regulating the voltage and controlling the amperage of the battery charging current from the generator of an automotive vehicle.

Heretofore, devices of this type have ordinarily been in the form of a base member adapted to be attached to a support on the vehicle, the base member having permanently mounted thereon two magnetically-actuated vibrators and a magnetically-actuated relay. One vibrator provides the current-regulating means and the other the voltage-regulating means. These vibrators have usually been in the form of a spring arm carrying an armature and permanently connected into the magnetic circuit of a solenoid coil mounted on the base, the solenoid coil having a magnetic core for attracting the armature and thereby vibrating the spring arm. The vibration of the spring arm sets up a resistance in the field circuit of the regulator which controls the rate of charging of the battery. In a majority of instances the failure of voltage regulators or control devices of this type has usually resulted from the pitting and failure of the contacts on the vibrators. These contacts are subjected to considerable wear and oxidation.

It is an object of this invention to provide a device of the type described wherein the vibrating devices, and the relay if desired, are in the form of tubes, preferably vacuum, adapted to be removably mounted on the base of the device and connected into the electrical circuit of the device by plug-in sockets. With the control device of this invention, should the contacts on the vibrators of any tube burn out or otherwise fail to operate properly, it is merely necessary to replace the worn tube with a new tube of the corresponding type. Thus, the life of the device as a unit is prolonged considerably and the repair thereof is in most instances reduced simply to the operation of removing one tube and replacing it with another.

Another object of the invention is to provide a regulating device of the type described which includes compensating elements arranged to permit a larger charging current to be generated during the initial stages of charging as compared with later on when the system has become warmed up. The compensating elements also allow charging the battery at a higher rate in cold weather than in warm weather. The provision of these compensating elements is important when it is considered that a battery will accept a larger charging current during the initial stages of charging than it will subsequently if the charging continues. It is also recognized that a battery requires a larger charging current during cold weather than it does during warm weather.

More specifically, the invention contemplates a current- and voltage-regulating device in the form of a tube which is arranged to be removably plugged into the base of a voltage regulator to complete the electrical circuit provided by the electrical connections on the base member. The tube includes a pair of spring arms having contacts at their free ends and carrying armatures which, when the tube is inserted in its proper socket on the base member, are disposed within the field of a solenoid winding on the base. A metallic strip on each arm cooperates with the spring arm to form a thermostatic bimetal element which varies the contact pressure at the contacts in response to changes in ambient temperature.

In the drawings:

Fig. 4 is a fragmentary transverse sectional view through the voltage-regulating coil of the regulator shown in Fig. 1.

Fig. 5 is a fragmentary top view of the coil arrangement shown in Fig. 4.

Fig. 6 is a sectional view through the voltage-regulating tube.

Fig. 8 is a diagram showing another form of circuit for the voltage regulator of this invention.

Figure 1:
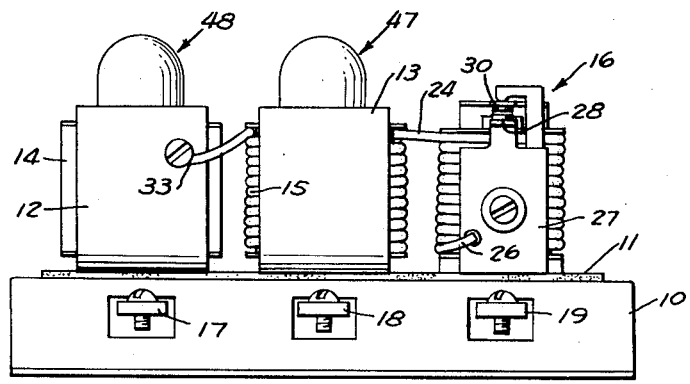
Fig. 1 is a side elevation of a voltage regulator with the cover removed and showing the tubes forming the regulating devices of this invention mounted on the base of the regulator.

The voltage regulator of this invention generally comprises an apertured base 10 which supports upper and lower insulative plates 11, yokes 12 and 13 mounted on base 10 as by screws 13a and surrounding solenoid coils 14 and 15, a relay 16, and armature, field and battery terminal connectors 17, 18 and 19. Solenoid 14 provides a voltage-responsive winding and solenoid 15 comprises a current-responsive winding. Coil 14 has one end 20 thereof connected to a ground terminal as at 21, and at its other end 22 coil 14 is connected in series with one end 23 of coil 15. The other end 24 of coil 15 is connected in series with the current winding 25 of relay 16. The other end 26 of current winding 25 is connected to a yoke member 27 of relay 16 which supports a contact 28. The spring-biased armature 29 of relay 16 has a contact 30. Contacts 28 and 30 are opposed and normally spaced apart. Relay 16 also includes a voltage winding 31 having one end 32 connected to ground terminal 21 and its other end 32a connected with the end 26 of winding 25.

Terminals 17 and 18 extend inwardly through the side wall of base 10 to the lower plate 11. These terminals are in the form of bus-bars supported on the under side of plate 11 by screws 13a. The end 23 of coil 15 is connected to terminal 17 through yoke 12 as at 33 and screws 13a. The battery terminal 19 is electrically connected with the spring-biased armature 29 of relay 16 through screw 34. The resistor 35 is connected across terminals 17 and 18 and a second resistor 36 is connected to ground terminal 21 at one end and to terminal 18 at its other end. The use of resistors in this manner to reduce pitting of the contacts of the regulator is conventional.

The portion of the voltage regulator circuit thus far described is a conventional circuit, and in operation the terminal 17 is connected to the negative brush 37 of the armature 40 of the generator 41 of the vehicle. The positive brush 42 of the generator armature is connected to ground. The terminal 18 of the regulator is connected to one side of the generator field winding 43, the other side of the field winding being grounded as at 44. The battery terminal 19 is connected to the negative side of the battery 45, the positive side of the battery being connected to ground as at 46.

The invention here is primarily concerned with the vibrating devices for controlling the charging current to battery 45. These regulating devices are in the form of a current-regulating tube 47 and a voltage-regulating tube 48. Tubes 47 and 48 are preferably evacuated so that they operate under a vacuum. They may, however, be filled with an inert gas such as hydrogen. Tubes 47 and 48 are in most respects of similar construction, each including a base 49 and a glass envelope 50 which is sealed on base 49. The base 49 of tube 47 insulatively supports a pair of contact prongs 51 and 52, and the base 49 of tube 48 insulatively supports a pair of contact prongs 53 and 54. Base plates 11 are formed with spaced apart apertures 55 therein through which the prongs of tubes 47 and 48 may be inserted. On the bottom plate 11 spring contacts 56, 57, 58 and 59 are provided for engaging the prongs of tubes 47 and 48. Contact 56 is connected with terminal 18, contact 58 is connected with terminal 17, and contacts 57 and 49 are connected together and supported on the bottom plate 11 by an electrical conducting bar 60. The prongs of each tube and the spring contacts are designed such that the tube can be mounted on base 10 with either of its prongs engaging either of the spring contacts.

Within each tube the contact prongs are electrically connected with supporting blocks 62. A spring arm 63 is mounted on each of the supporting blocks 62. Arms 63 are provided with normally closed contacts 64 at the free ends thereof which open and close when the arms flex. Each arm 63 has supported thereon as by a rivet 66 an armature 65. The lower ends 67 of armatures 65 terminate just above the upper surfaces of supporting blocks 62. The upper end 68 of each armature is spaced from its associated spring arm 63 and is threaded to receive an adjusting screw 69, the active end of screw 69 being arranged to be brought into pressure engagement with its associated spring arm 63 to thereby regulate the contact pressure between the contacts 64. Screws 69 are adjusted at the factory when the tube is assembled to produce a desired operating condition.

Each spring arm of the voltage-regulating tube 48 has, in addition, mounted thereon a flat strip 70 which is secured in a position extending longitudinally of and overlying a portion of the spring arm by spaced rivets 66 and 71. The spring arms 63 are preferably formed of spring steel, whereas the strips 70 are formed of brass or other metal having a coefficient of thermal expansion much greater than the material from which the arms 63 are formed. Thus, each strip 70 provides in combination with its spring arm 63 a bimetal element which is responsive to changes in temperature to produce a flexing of the spring arm. As the ambient temperature increases, the spring arms of tube 48 will tend to flex in a direction away from each other thereby decreasing the contact pressure between contacts 64. Likewise, when the ambient temperature drops, the strips or compensators 70 tend to increase the contact pressure between contacts 64.

Figure 2:
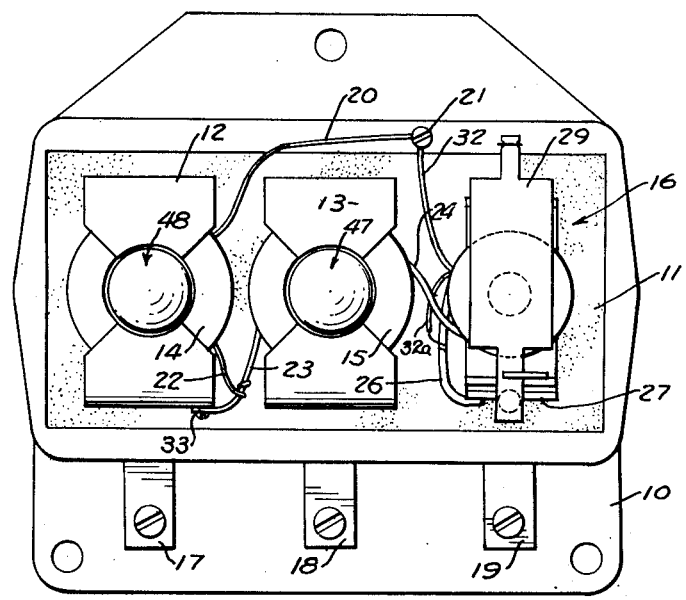
Fig. 2 is a top plan view of the regulator.
Figure 3:
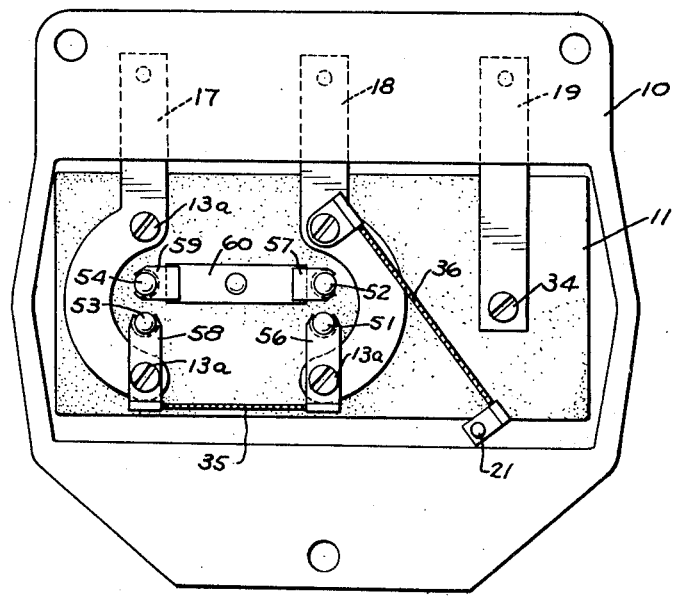
Figure 3 is a bottom view of the regulator.

Referring now to Figs. 2 and 5, it will be observed that coils 14 and 15 are arranged and positioned on top plate 11 such that the tubes 48 and 47, respectively, when mounted on plate 11, extend axially upwardly through these coils. Thus, the armatures 65 are disposed directly within a high-strength portion of the magnetic fields of these coils. Likewise, it will be observed that yokes 12 and 13 straddle the prong openings 55 in plate 11 and are each formed with an opening 38 which accommodates the base 49 of its respective tube. The upper free ends 39 of yokes 12 and 13 are bent inwardly towards each other and are fashioned with arcuate edge portions 61 which are spaced only slightly from opposite sides of the glass envelope 50 of the tube. These end portions 39 are aligned horizontally with the upper ends 68 of armatures 65. Thus, yokes 12 and 13 provide an effectively positioned return path for the magnetic flux flowing through the armatures.

When the generator 41 is set in operation the voltage builds up at the positive brush 42 of the generator and the current travels to ground and from ground at 21 through the voltage winding 31 and current winding 25 of relay 16 through conductor 24, winding 15, and back to the negative brush 37 of the generator. Current also flows from the positive brush 42 of the generator through ground and from ground at 21 through conductor 20, winding 14, conductor 22, and back to the positive brush of the generator through terminal 17. At the same time current flows from the positive brush 41 of the generator through ground at 44, through field winding 43, terminal 18, contact 56, prong 51, the spring arms and contacts 63 and 64, respectively of tube 47, prong 52, contact 57, conductor 60, contact 59, prong 54, the spring arms and contacts 63 and 64, respectively of tube 48, prong 53, contact 58, conductor 22, and back to the negative brush 37 of the generator through terminal 17.

Contacts 28 and 30 are normally spaced apart to prevent current from flowing from battery 45 back into generator 41. However, as the speed of the generator increases, the current in the field 43 gradually builds up to a point where the current flowing through the voltage winding 31 of regulator 16 is sufficient to cause the core 72 of relay 16 to pivot armature 29 downwardly and close contacts 28. When contacts 28, 30 close, a charging current flows from the positive brush 42 of generator 41, through ground at 46 into the positive side of battery 45 and from the negative terminal of battery 45 through terminal 19, relay yoke 27, which is electrically connected with terminal 19 by screw 34, armature 29, contacts 28, 30, winding 25, conductor 24, coil 15, and back to the negative brush 37 of generator 41, through terminal 17. When this charging current reaches a predetermined value, that is a value determined by the setting of screws 69 on the current-regulating tube 47 which, for example, may be on the order of 32 amperes, the value of the ampere turns of the current winding 15 is sufficient to cause the contacts 64 and arms 63 of tube 47 to start vibrating. In this connection it will be observed that the armatures 65 are arranged such that the corresponding ends thereof will be of like polarity and tend to repel one another. The screws 69 are originally adjusted at the factory such that, when the current through winding 15 reaches a predetermined value, the upper ends 68 of armatures 65 repel one another with a force sufficient to cause the contacts 64 to separate. Thus, the contacts 64 are caused to vibrate very rapidly, and this vibration intermittently opens and closes the field circuit and sets up a resistance in the field circuit of the generator which in turn decreases the current in the field 43 to a point where the current flowing through the battery 45 is maintained in a relatively constant value.

When the voltage across the battery reaches its fully-charged value, the current flowing through winding 14 causes the arms 63 to start vibrating. Since tubes 47 and 48 are connected in series, vibration of arms 63 in the voltage-regulating tube 48 produces the same effect in the field winding 43 of generator 41 as the vibration of the arms 63 of the current-regulating tube 47. Therefore, when the arms 63 of voltage-regulating tube 48 start vibrating, the current through the field 43 is lowered and the current through the battery 45 is thereby lowered to a value less than the setting of the current-regulating tube 47. Under such circumstances, the contacts 64 of the current-regulating tube 47 remain closed and the tube 48 assumes control of the charging current to the battery, the current-regulating tube 47 merely operating on a closed circuit. The operation of voltage-regulating tube 48 therefore decreases the current through the battery 45 to a value where only sufficient current is being delivered to the battery to maintain the voltage across the battery at its fully-charged value.

It will be appreciated that, when battery 45 is cold, it can be safely charged with a greater current than it can after it has been in operation for some time. It is therefore desirable to decrease the maximum value of the charging current after the battery has been in operation for a while. The compensators 70 serve this purpose. The current flowing through the voltage winding 14 causes the temperature of the winding to gradually increase, and the resistance of the winding likewise increases. Normally this would decrease the effective ampere turns of the winding 14 and raise the voltage at which the contacts 64 of tube 48 would start to vibrate. However, the compensators 70 overcome this tendency by decreasing the contact pressure between the contacts as the ambient temperature increases. In addition, it will also be appreciated that in a like manner the compensators 70 will permit a larger charging current to flow to the battery during cold water as compared with warm weather, since the ambient temperature of the compensators 70 decreases arms 63 tend to flex inwardly toward each other and the contact pressure between contacts 64 is increased; and the voltage at which the arms 63 of tube 48 start to vibrate is likewise increased.

With the regulating tube described herein, it will be noted that, by mounting the armatures directly on the spring arms and by providing two spring arms, each of the spring arms travels through half the distance that a single spring arm would have to travel as in conventional vibrators. Furthermore, by providing two vibrating spring arms instead of a single spring arm and a single armature, which is conventional, the contacts 64 vibrate twice as fast. This produces not only a more uniform regulation of current but tends to decrease the likelihood of pitting of the contacts. The prongs of the tubes are arranged symmetrically so that a tube may be removed, turned through 180°, and replaced. Reversing of the tubes in this manner causes the reversal of the direction of current flow through the tube. This also tends to minimize the effect of pitting. The use of tubes as described is also desirable from the standpoint of adapting the regulator to various conditions of load. If it is desired to increase the maximum charging current, say from 32 amperes to 36 amperes, then instead of replacing the whole voltage-regulator unit it becomes necessary simply to replace the regulating tubes with tubes adjusted to operate at a higher load.

The use of spring arms 63 as described is desirable for another reason. Regulators as now constructed have to be initially adjusted in an upright position, that is, the position in which they are mounted when in service. The arms 63, each operating in a direction opposite to the other, can be moved to or mounted in any position without affecting the operation of the regulator. If the tubes are disposed with their axes extending horizontally rather than vertically as shown, one arm 63 would sag slightly because of its weight; but the other arm would also sag the same amount so that the operation of the tube would not be changed. It has been found that the tubes can be disposed in any position without affecting the tube adjustment.

Another important feature of the invention is that the operation of the regulator is not affected by magnetic surroundings. With conventional regulators with which I am familiar the operation is noticeably affected by magnetic surroundings. For instance, some regulators will deliver about twice as much current with the cover removed as they will when the cover is on. When such regulators are adjusted at the factory, the person making the adjustments has to continually remove and replace the cover between adjustments until the proper adjustment is obtained. With the regulator of this invention the cover has no effect on the operation, and the tubes can therefore be adjusted separately from the instruments on which they are to be used.

Figure 7:
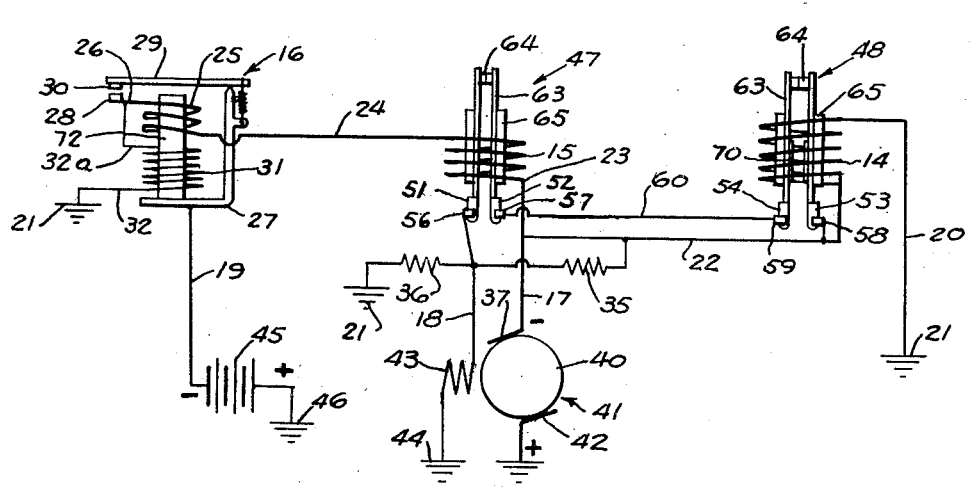
Fig. 7 is a diagram showing one form of circuit for the voltage regulator of this invention.

The wiring diagram shown in Fig. 8 is generally the same as shown in Fig. 7 with the exception, however, that the relay 16 has been replaced by a relay tube 80. Tube 80, like tubes 47 and 48, includes a pair of spring arms 81 carrying armatures 82 and provided with contacts 83 at the upper free ends thereof. Spring arms 82 are arranged such that contacts 83 are normally spaced apart and adapted to close when the voltage of the charging current builds up to the battery voltage. Tube 80 is provided with contact prongs 84 and 85, and suitable spring contacts 86 and 87 are mounted on base plate 11 for connecting prong 84 with terminal 19 and prong 85 with windings 25 and 31 when the tube is mounted on base plate 11. Thus, with the form of device illustrated in Fig. 8, all of the operating mechanisms of the regulator, that is, the relay and the current- and voltage-controlling means, are in the form of tubes which can be readily removed and replaced when repair becomes necessary.

I claim:

1. In a device for controlling the battery charging current from the generator of a motor vehicle, the combination of a base, a solenoid winding on said base, opposed magnetic yoke members, each having opposed pole portions at opposite ends of said solenoid, means on said base and aligned axially with said solenoid winding and forming a tube receptacle, a tube comprising a magnetic switch removably engaged in said receptacle, said tube extending axially within said solenoid winding and being physically unconnected thereto, said tube having a pair of spring arms therein provided with opposed contacts which are arranged to make and break when said spring arms are flexed, each of said arms supporting an armature having opposed end portions positioned within the magnetic field of said opposed pole portions of said yoke members, and electrical connections on said base for connecting said winding and said tube into an electrical circuit.

2. In a device for controlling the battery charging current from the generator of a motor vehicle, the combination of a base, a solenoid winding mounted on said base, opposed magnetic yoke members, each having opposed pole portions at opposite ends of said solenoid, an electrical vibrating device comprising a magnetic switch mounted on said base independently of said solenoid winding for easy removal therefrom, said vibrating device including a pair of spring arms extending axially within said solenoid winding and provided with contacts which are arranged to make and break a circuit through said spring arms when the spring arms are flexed, each of said spring arms supporting an armature having opposed end portions positioned within the magnetic field of said opposed pole portions of said yoke members, and electrical connections on said base for connecting said winding and said spring arms into an electrical circuit.

LUTHER EARL SEVISON.

References Cited in the file of this patent

UNITED STATES PATENTS

| Number | Name | Date |
| --- | --- | --- |
| 1,513,247 | James | Oct. 28, 1924 |
| 1,876,295 | Hofgaard | Sept. 6, 1932 |
| 2,286,800 | Gustin | June 16, 1942 |
| 2,299,669 | Werner | Oct. 20, 1942 |
| 2,434,909 | Curtis | Jan. 27, 1948 |
| 2,440,265 | Gross | Apr. 27, 1948 |
| 2,564,877 | Buckingham et al. | Aug. 21, 1951 |
| 2,570,315 | Brewer | Oct. 9, 1951 |

FOREIGN PATENTS

| Number | Country | Date |
| --- | --- | --- |
| 536,695 | Great Britain | May 23, 1941 |